United States Patent [19]

Harris

[11] 4,258,960
[45] Mar. 31, 1981

[54] WOUND GLASS FILAMENT REINFORCED RESIN SLIP SLEEVE LINER
[75] Inventor: Bernard Harris, Bayside, Wis.
[73] Assignee: Rexnord, Inc., Milwaukee, Wis.
[21] Appl. No.: 856,439
[22] Filed: Dec. 1, 1977

Related U.S. Application Data

[63] Continuation of Ser. No. 730,053, Oct. 6, 1976, abandoned.
[51] Int. Cl.³ .................. F16C 33/00; B32B 31/00; D03D 13/00; B65H 81/00
[52] U.S. Cl. ............................ 308/238; 156/154; 156/168; 156/175; 308/241; 308/DIG. 8; 428/36; 428/222
[58] Field of Search ............... 156/175, 153, 154, 168, 156/193, 194, 211; 428/36, 222, 268, 273, 398; 308/238, 241, DIG. 8

[56] References Cited
U.S. PATENT DOCUMENTS

| 2,843,153 | 7/1958 | Young | 156/175 |
|---|---|---|---|
| 3,616,000 | 10/1971 | Butzow et al. | 156/173 |
| 3,692,375 | 9/1972 | Matt et al. | 308/238 |
| 3,804,479 | 4/1974 | Butzow et al. | 308/238 |

Primary Examiner—William R. Dixon, Jr.

[57] ABSTRACT

A slip sleeve liner such as for a telescoping drive line is of generally square cross-section. A low-friction material forms the inner face. The body of the liner is of a cured epoxy resin reinforced with circumferential glass filaments. These glass filaments extend uniquely around the corner to provide the reinforcement of the resin which is required to prevent its failure under the strains resulting from the torque loading.

1 Claim, 15 Drawing Figures

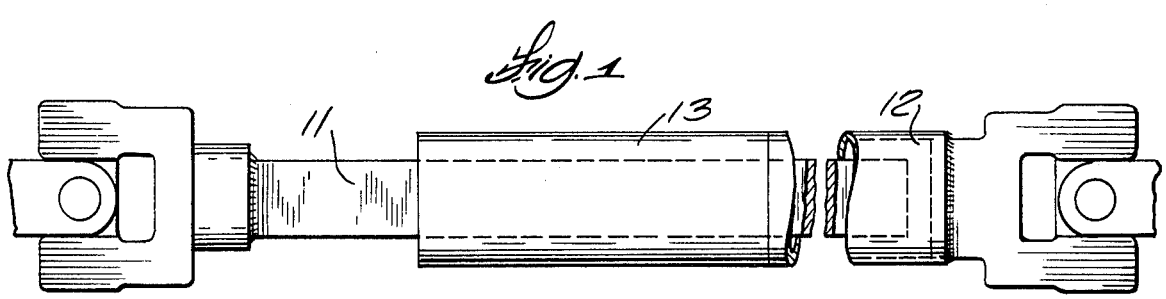
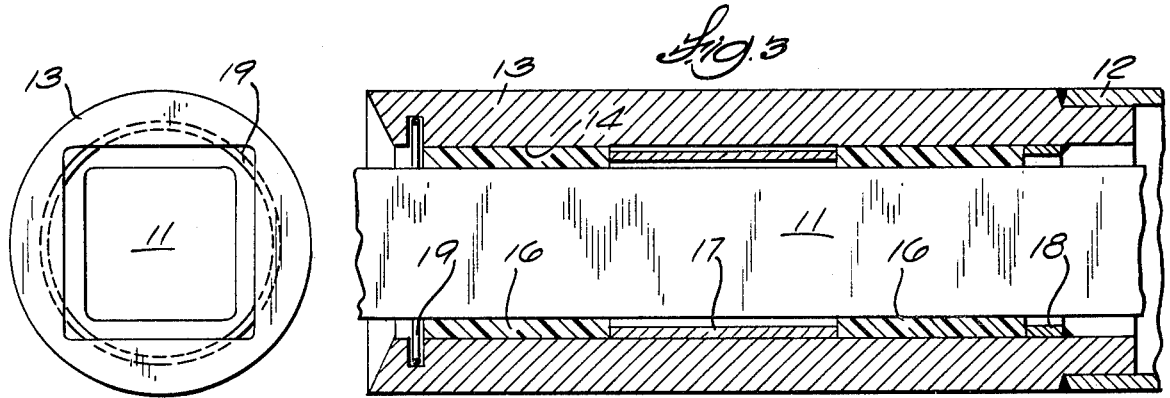
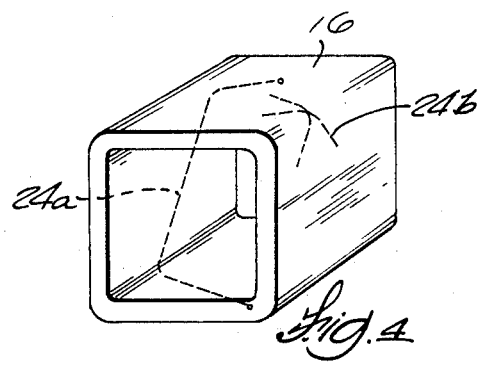
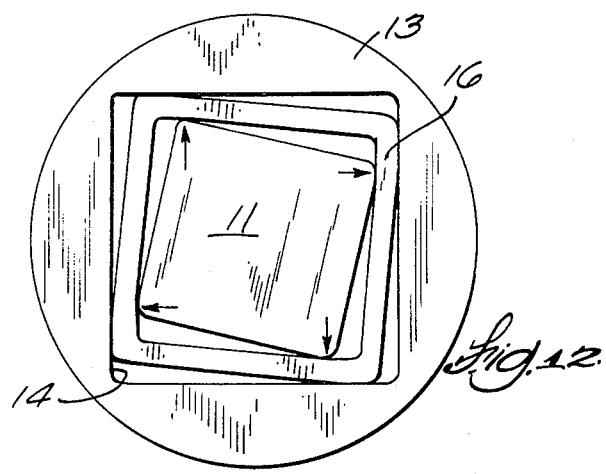
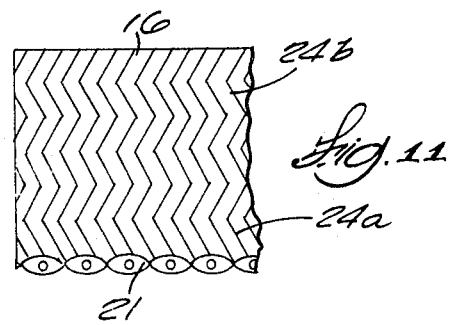
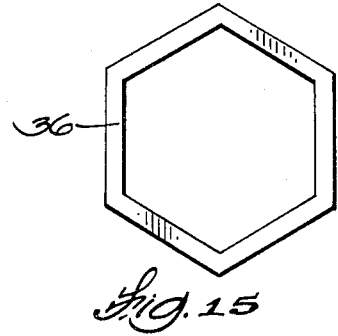

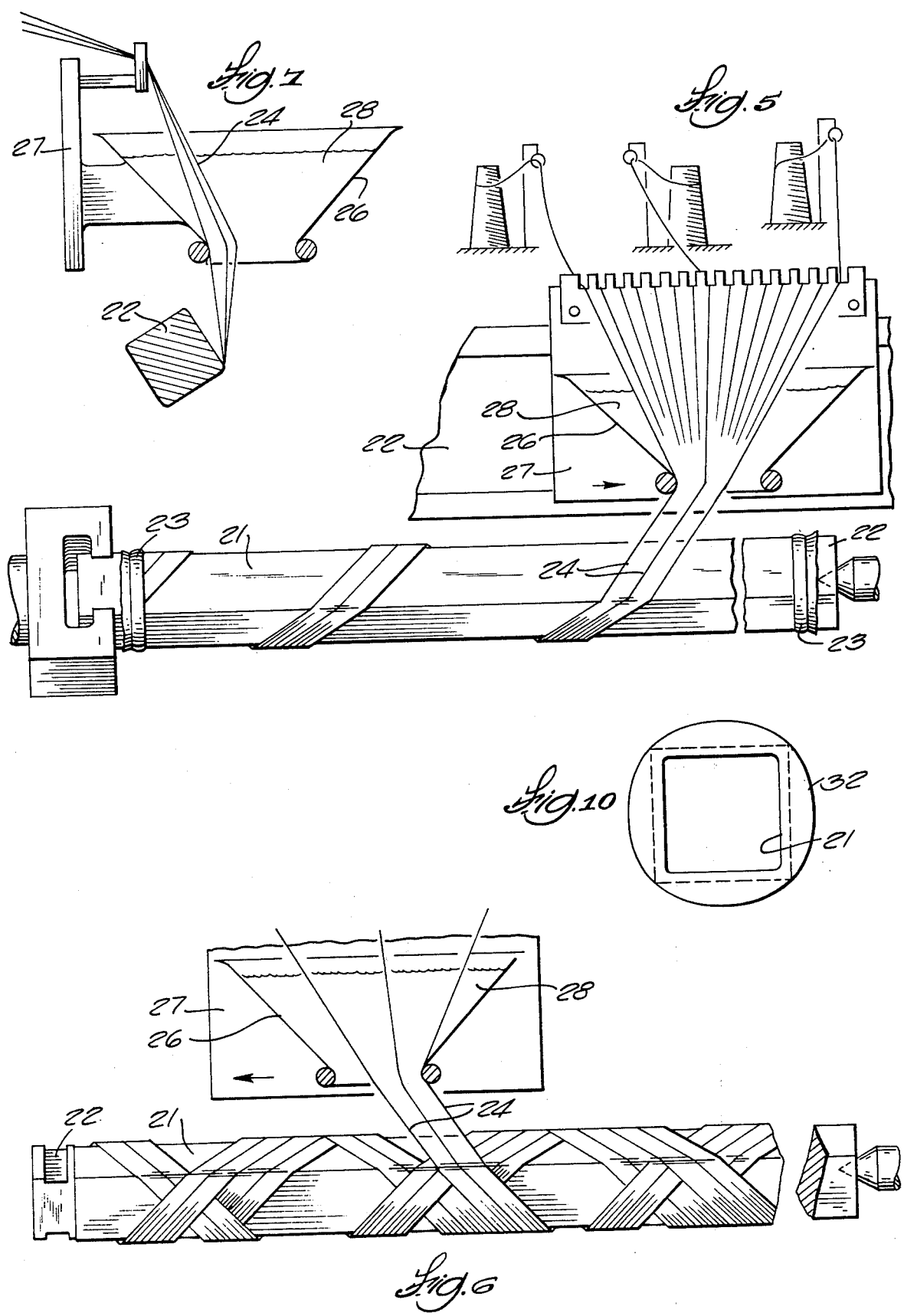

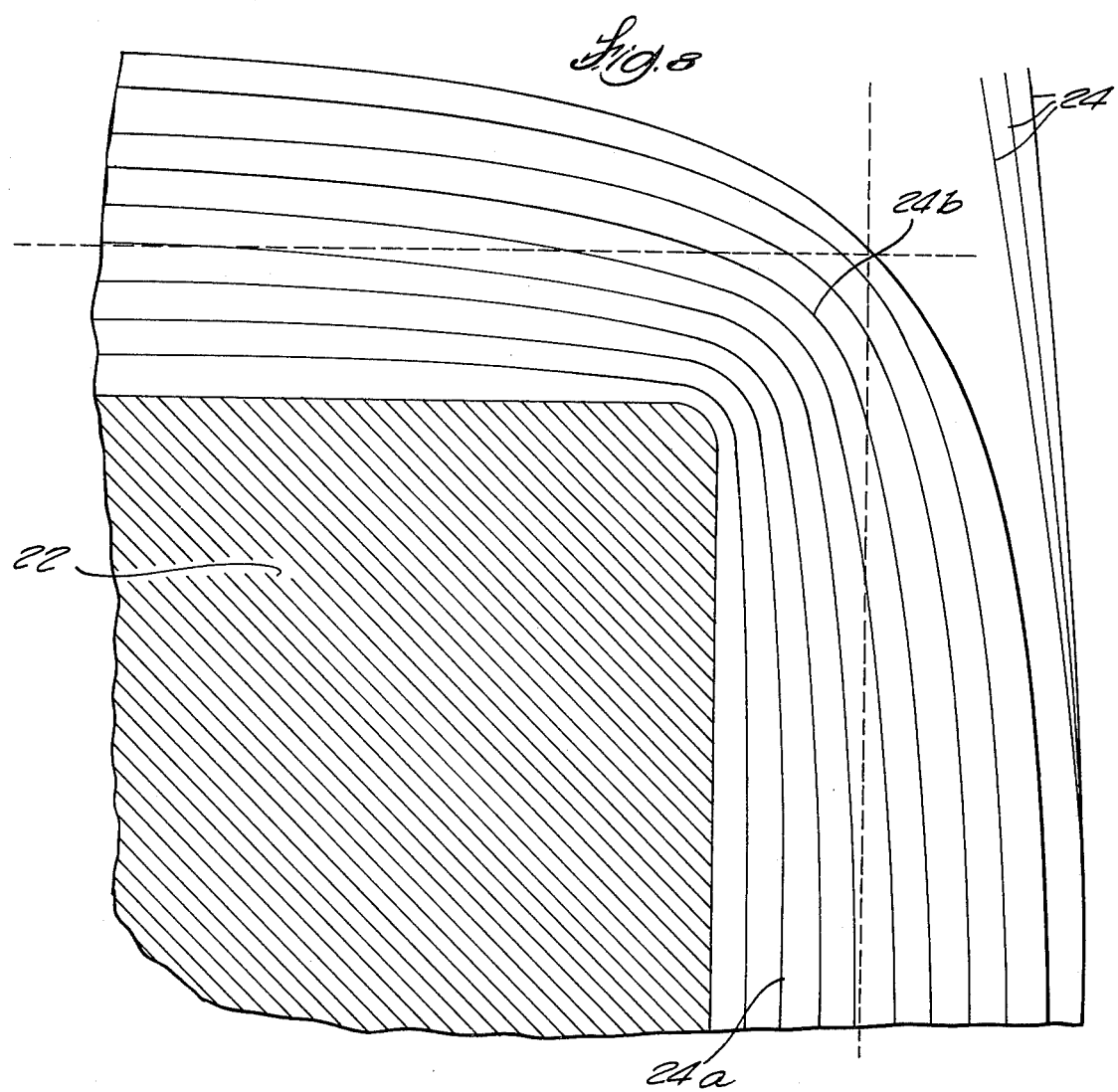
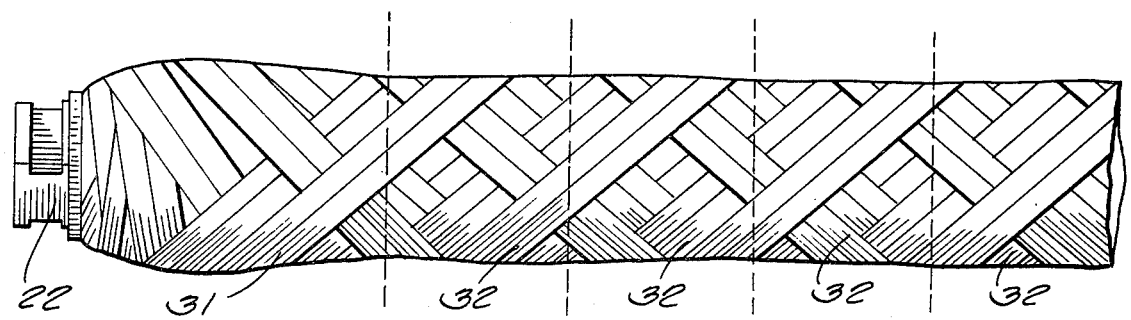

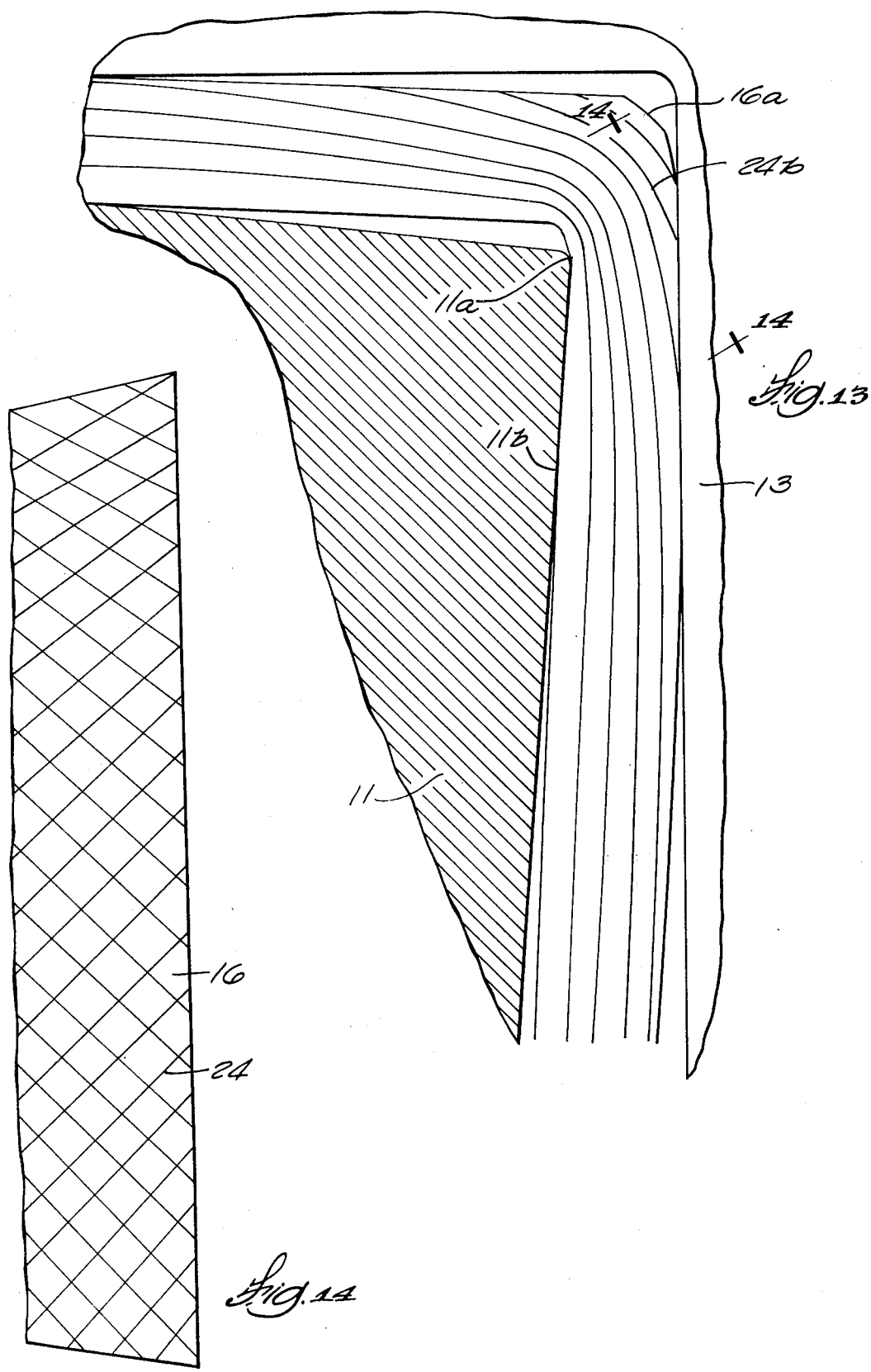

WOUND GLASS FILAMENT REINFORCED RESIN SLIP SLEEVE LINER

REFERENCE TO RELATED APPLICATION:

This application is a continuation of application Ser. No. 730,053 filed Oct. 6, 1976 and abandoned on the date of this application.

BACKGROUND OF THE INVENTION

U.S. Pat. No. 3,616,000 discloses a low-friction bearing sleeve having a cylindrical resin body reinforced by glass filaments embedded therein. Such a bearing is capable of supporting relatively high radial loads when properly supported and fixed in the bore of a rigid supporting housing. A somewhat similar bearing having a square or noncircular bore and a cylindrical outer glass filament reinforced resin body has similar capabilities.

A telescoping drive-line such as for agricultural implements generally has a square inner shaft and a tubular outer shaft which includes a sleeve at one end with a square bore in which the inner shaft is axially slideable. Such a drive-line requires dependable lubrication because of the high pressure loads due to the high torque loads which are imposed sometimes while there is no relative axial motion. Fitting a square liner in the square bore to provide a low-friction sliding bearing surface which does not require lubrication has been proposed. However, ordinary injection molded plastics with a low-friction inner face have not been considered adequate in strength because of the distortion which is due to the clearances which are more or less unavoidable. This will be further explained hereinafter.

U.S. Pat. No. 3,700,295 describes and claims a resin-bodied outer race or socket for a ball and socket bearing and having overlying glass filament reinforcing which includes filaments extending from each end face of the socket to its cylindrical outer face. However, the layers of glass filaments here are not concentrated at one location or another as is provided by the present invention.

SUMMARY OF THE INVENTION

A straight shaft having a uniform square or regular polygonal section is axially slideable in a bearing liner which is adapted to be fitted in the bore of an outer sleeve. The sleeve bore is of a similar cross-section. In the use of the liner for the transmission of torque, the inner shaft applies a radial load to relatively narrow areas of the liner which are parallel to and spaced slightly from the corners of the liner, depending upon in which direction the rotation is applied. This loading on all four corners of the liner tends to bend open or enlarge the corner angles of the liner.

The liner of the present invention is in the form of a thin-walled glass filament-wound resin bodied tubular structure of uniform similar inner and outer cross-sections. A low-friction fabric or other material is embedded in the resin and forms the inner face of the liner in which the shaft is axially slideable. The liner is an approximately square tubular structure and is made in multiple by first applying the low-friction fabric to an approximately square mandrel of some length. Successive layers of glass filaments are then wound around the mandrel and over the material and at the same time the uncured resin is applied therewith. The initial layers of the glass filaments follow the generally square outline of the structure. Successive layers of the glass filaments which are applied thereover form a structure which becomes progressively rounded in section, until the structure has an adequate size. The resin is then cured and the four sides of the hardened structure are machined or ground so that the structure is of a generally square tubular section. The structure is then cut to provide liners of the desired length.

The inner layers of the glass filament extend helically around the structure and from end to end. Other layers of the glass filaments extend only across the corners of the liner and uniquely reinforce the corners of the liner which are especially strained under load as described above.

In particular, the roves are applied under a tension of in the order of 4 pounds per rove. As the roves of the second and successive layers are applied, the lower layers are greatly compressed at their corners and less so between their corners. The resulting pressure differential allows or causes the resin in the roves to flow out of the corners and permit the filaments to be more concentrated at the corners and less so intermediate the corners. That is, the resin intermediate the corners causes the filaments to be bowed outwardly. This effect is believed to be the key to providing the favorable distribution of the stresses in the liner under load in a telescoping drive line.

BRIEF DESCRIPTION OF THE SEVERAL VIEWS OF THE DRAWINGS

FIG. 1 shows a typical telescoping driveline. The outer shaft is broken away and sectioned.

FIG. 2 is an end view of the open end of the outer shaft.

FIG. 3 shows in section the sleeve of the outer shaft and the liners of the present invention in which the inner shaft, shown in part, is axially slideable.

FIG. 4 is a perspective view of one of the liners shown in FIG. 3.

FIG. 5 illustrates the method of making the liners of the present invention. The inner fabric sleeve is shown applied to the mandrel which is of the same section as the inner shafts of the drive-line of FIG. 1. The view includes three of the fifteen creels of glass filament roves and the carriage for the funnel through which the roves pass to form a parallel, resin-impregnated tape which is wound over the fabric. Only three roves of the tape are shown for clarity of the view.

FIG. 6 shows the tape as applied to the fabric after several passes of the carriage.

FIG. 7 shows the mandrel of FIGS. 5 and 6 in cross-section and shows the tape passing through the funnel.

FIG. 8 is an enlarged view of one corner of the mandrel in section. The radial dimensions of the successive layers of the filament windings are shown in solid lines; the outer dimensions of the completed liner are shown in broken lines.

FIG. 9 shows one end of the mandrel after the wound tube is completed. The broken lines denote where the tube is cut into shorter lengths.

FIG. 10 shows the outline of the cross-section of the completed winding and broken lines which show where the short lengths of the tube are cut to the outer dimensions of the individual liners.

FIG. 11 shows in cross-section a portion of the completed liner.

FIG. 12 shows the cross-sections of the inner and outer shafts of the drive-line of FIG. 1 and the intermediate liner. The clearances therebetween are greatly enlarged to illustrate the deformation of the liner which is effected by the drive-line under a torque load.

FIG. 13 is an enlarged cross-section of a corner of the inner and outer drive shafts and of the liner. The clearances are similarly enlarged to show deformation of the liner in relation to its glass filament reinforcing.

FIG. 14 is a section taken on line 14—14 of FIG. 13. The intersecting lines represent the relative shift of the glass filament reinforcing as strained by the torque load illustrated in FIG. 12.

FIG. 15 is an end view of a liner having six sides and which may embody the present invention.

DESCRIPTION OF THE PREFERRED EMBODIMENT

The telescoping drive-line shown in FIG. 1 includes the square inner shaft 11 and the tubular outer shaft 12 which includes the machined sleeve 13. Shaft 11 in section is typically approximately 1⅛ inches square and the square bore 14 of sleeve 13 is approximately 1⅜ inches square. Two liners 16 of the present invention are fitted in bore 14 as shown in FIG. 3. They and the intermediate spacer 17 are secured endwise by the abutment 18 at one end and the removable retaining ring 19 at the other, open end of sleeve 13.

It is important to note here that liners 16 are inserted and removable by hand from bore 14. Thus, each liner 16 has a slip-fit as to both the sleeve 13 and the shaft 11 such that in the operation of the drive line, the clearances necessarily allow some rotation of shaft 11 relative to sleeve 13. As a consequence, each wall of liner 16 is compressed by directly oppositely applied forces only after first being distorted as shown in FIG. 12. The liner 16 of the present invention and as constructed according to the present invention is uniquely adapted to accommodate such distortion.

The construction of the liner is shown in FIGS. 6–10 and is similar to the method of making low-friction journal or sleeve bearings as disclosed in U.S. Pat. No. 3,616,000. A low-friction material 21 is fitted to the square mandrel 22 which is of the same section as shaft 11 and may be in the order of four feet in length. For material 21, a tubular fabric such as disclosed in U.S. Pat. No. 3,804,479 is preferred. A band 23 secures the fabric at each end of mandrel 22. A number of parallel roves 24 of glass filaments are then wound spirally around the material by rotating the mandrel 22 and guiding the roves through the lower opening of funnel 26. Funnel 26 is mounted on the reciprocating carriage 27 and is provided with a closure device, not shown, whereby the funnel is adapted to carry a supply of liquid resin 28. The roves 24 are drawn from creels and are impregnated with resin as they pass through the funnel. The paralled roves 24 are closely spaced and form a "tape." In FIGS. 5 to 8 only three roves of each "tape" are shown for clarity. The "tape" is applied at an angle of about 54° so that both axial- and hoop-strength will be adequately provided by the glass filaments. However, because of the limited width of the "tape," the winding pattern is such that, as shown, two full, opposite layers of roves 24 are completed with six passes of carriage 27. (In the construction of liners of especially small size, the tape might be wound to provide two layers with four passes, or with adjacent helices.) The winding is continued until the outermost layers are outside of the projected dimensions of the completed liner as shown in FIG. 8. The "tape" is wound so that each rove 24 is applied with a tension in the order of four pounds and, as shown, the layers are particularly compressed at the corners of the mandrel as shown. These layers at the corners of the mandrel include the innermost layers 24a, the intermediate layers 24b and the outermost layers 24c as will be further described. When completed, the assembly, as shown in part in FIG. 9, is placed in an oven and the resin is cured and hardened. The rigid tubular assembly is then removed endwise from mandrel 22, the end knob 31 is cut off and discarded and the sections 32 are cut to the desired lengths of the intended liners. Each section 32 is then cut to the outer dimensions shown by the broken lines in FIGS. 8 and 10 to provide liners 16 such as that shown in FIG. 4 and having a section such as that shown in FIGS. 8 and 13. The sharp corners 16a of the liner are rounded to accommodate the rounded corners of bore 14.

To resist distortion, the liner of the present invention comprises a tubular resin body having an inner low-friction face and a concentration of glass filament reinforcing extending diagonally across the corners in opposite directions. The distortion of liner 16 under load in the bore 14 of sleeve 13 is shown in FIGS. 12 and 13. The shaft 11 is rotationally displaced clockwise and the liner 16 is rotationally disposed intermediate the shaft and the bore 14 of sleeve 13. With reference to FIG. 13, the effective bearing face of the shaft 11 thus extends only from the corner 11a of the shaft to an undefined line, designated 11b, where the separation of the shaft and the liner appears. Maximum compression of the liner, of course, occurs at the shaft corner 11a which is spaced from the corner 16a. Additionally, a portion of the liner, namely that which is intermediate its corner and its section under maximum compression, is oppositely bent with respect to the two adjoining portions of the liner. Under radial or circumferential compression, the resin of the liner tends to be displaced axially or lengthwise of the liner and the glass filaments reinforce the resin to restrain such displacement. The filaments referred to are those of the roves which extend from end to end of the liner. In FIGS. 8 and 13 they are the roves 24a. The roves of the outermost layers 24c extend diagonally across the corners of the liner as shown in FIG. 8. The roves of the intermediate layers 24b are extended to reinforce the sections of the liner which lie between corners 11a of the shaft and lines 11b and which are under maximum compression as has been described.

The roves 24b which extend across the corners of the liner similarly reinforce the resin, but are also adapted to flex in the manner of an article with a braided reinforcing. That is, the layers 24a of filaments extend from end to end of the liner and circumferentially depending upon the length of the liner. Additionally a smaller number of layers 24b of filaments extend toward the adjacent corners of the liner to reinforce the sections of the liner between corners 11a and lines 11b which are compressively loaded in the operation of the drive line shown in FIG. 1. More particularly, the roves of layers 24b extending helically in one direction cross over other layers 24b extending helically in the other direction. The outermost layers 24c extend only diagonally across the corners of the liner. That is, and with reference to FIG. 14, the roves 24b of various layers cross over the roves 24b of other layers and are adapted to move angularly respecting each other to whatever small extent is required to allow the distortion of the liner as shown and described.

FIG. 14 represents a section taken on line 14—14 of FIG. 13 such that the portion at the left of FIG. 14 is circumferentially in compression and the portion at the right is circumferentially in tension. As shown, the angularity of the roves increases or decreases slightly from the top of the Figure to the bottom. (The ends of the Figure are the ends of the liner.) Relative changes in the axial length of adjacent portions of the liner are thus allowed and localized stresses are avoided, while at the same time, of course, the overall resistance of the liner to crushing is undiminished. FIG. 14 may also be reversed to represent other sections taken across a corner of liner 16 where the liner is oppositely in compression and tension circumferentially.

The present invention is of particular significance where the liner is of a square configuration. The term square is intended to include a nearly-square rectangle. FIG. 4 showing liner 16 also depicts two of the glass filament roves 24b which extend diagonally across the corners of the liner and two of the inner glass filament roves 24a which extend from one end face of the liner to the other.

The tension of roves 24 as they are wound around mandrel 22 is, of course, of especial importance. A tension in the order of four pounds is presently used in carrying out the invention as described.

The invention may be of especial significance if the liner is of a triangular configuration, but this has not been investigated. A liner 36 of six sides is shown in FIG. 15. Such a liner when constructed as described is improved by the present invention although a lesser percentage of roves 24b will be provided to reinforce the corners.

Various embodiments of the invention may be employed within the scope of the following claims.

I claim:

1. In a low-friction axial bearing liner comprising a number of flat sides and intermediate corners forming a tubular structure having open ends and dimensioned to be inserted between rotationally driving and driven inner and outer elements and with some clearance therebetween for assembly and operating purposes such that only portions of the flat sides adjacent to the corners are subject to crushing by a torque load, a cured epoxy resin body forming said structure and having layers of helical glass filament reinforcing embedded therein, the inner layers extending around each corner being continuous from one end to the other end of the liner, the outer layers extending diagonally across the corners of the liner, the intermediate layers extending around each corner of the liner terminating intermediately of said ends thereof, said inner and intermediate layers providing the reinforcement of said portions of the liner against crushing by a torque load which may be applied to the liner in either direction while allowing limited distortion of the liner which is due to the geometrical displacement of the liner relative to the associated inner and outer elements resulting from their assembly and operating clearances.

* * * * *